US009850964B2

United States Patent
Kawai et al.

(10) Patent No.: US 9,850,964 B2
(45) Date of Patent: Dec. 26, 2017

(54) RATCHET TYPE ONE-WAY CLUTCH AND ARRANGEMENT OF PAWL MEMBER THEREIN

(71) Applicant: NSK-Warner K.K., Tokyo (JP)

(72) Inventors: Tsutomu Kawai, Fukuroi (JP);
Kazuyuki Fujita, Fukuroi (JP);
Masahiro Yamada, Fukuroi (JP);
Sousuke Kawai, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 77 days.

(21) Appl. No.: 14/717,000

(22) Filed: May 20, 2015

(65) Prior Publication Data
US 2015/0345574 A1 Dec. 3, 2015

(30) Foreign Application Priority Data

May 29, 2014 (JP) .................... 2014-110910

(51) Int. Cl.
*F16D 41/07* (2006.01)
*F16D 41/12* (2006.01)
*F16D 41/06* (2006.01)

(52) U.S. Cl.
CPC ............ *F16D 41/07* (2013.01); *F16D 41/12* (2013.01); *F16D 2041/0603* (2013.01)

(58) Field of Classification Search
CPC .............................................. F16D 2041/0603
See application file for complete search history.

(56) References Cited

U.S. PATENT DOCUMENTS

| 2003/0146063 A1* | 8/2003 | Yamada | F16D 41/12 192/46 |
| 2010/0288593 A1* | 11/2010 | Chiesa | F16D 41/12 192/46 |
| 2013/0213027 A1* | 8/2013 | Bird | F16D 41/12 60/361 |

FOREIGN PATENT DOCUMENTS

| CN | 103256365 A | 8/2013 |
| JP | 2001-208104 A | 8/2001 |

OTHER PUBLICATIONS

Office Action, dated Apr. 6, 2017, in Chinese Patent Application No. 201510257117.2.

* cited by examiner

*Primary Examiner* — Jacob S. Scott
*Assistant Examiner* — Lori Wu
(74) *Attorney, Agent, or Firm* — Shapiro, Gabor and Rosenberger, PLLC

(57) ABSTRACT

A ratchet type one-way clutch includes an outer race having a pocket, an inner race having a notch, a pawl member housed in the pocket to transmit torque between the inner race and the outer race, and having a tip portion engaging with the notch and a circular portion; and a spring urging the pawl member to the inner race is provided. A central angle of the circular portion is 180 degrees or greater. An angle between a segment between both ends of an opening of the circular arc portion and a segment between the circular portion of the pawl member and a contact point at which the tip portion engages with the notch is greater than 90 degrees, and an angle between the spring and a segment between the center of the circular portion and a center of the ratchet type one-way clutch is greater than 45 degrees.

7 Claims, 2 Drawing Sheets

RATCHET TYPE ONE-WAY CLUTCH AND ARRANGEMENT OF PAWL MEMBER THEREIN

BACKGROUND OF THE INVENTION

Field of the Invention

The present invention relates to a ratchet type one-way clutch that uses a ratchet (pawl member) for a lock mechanism and an arrangement of the pawl member therein. The ratchet type one-way clutch is used for a power transmission section, etc. in automobiles, agricultural machinery, construction machinery, industrial machinery and so on and has a function such as back stop.

Description of the Related Art

A one-way clutch used in an automatic transmission generally is provided with an outer race and an inner race that rotate relatively to each other and configured to transmit the rotational torque only in one direction by allowing sprags, rollers and others, which transmit the torque between the outer race and the inner race, to engage with a cam surface provided on a track surface of the outer race or the inner race. At the same time, the one-way clutch is configured to run idle in an opposite direction.

Among such one-way clutches, there is a ratchet type one-way clutch that uses a ratchet as a torque transmission member which transmits torque between the outer race and the inner race (see Japanese Patent Application Laid-Open No. 2001-208104). The ratchet type one-way clutch includes: an outer race having a pocket on an inner circumference thereof; an inner race arranged coaxially with the outer race and having a notch on an outer circumference thereof; a pawl member housed in the pocket and engaged with the notch of the inner race so as to lock the one-way clutch, thereby allowing torque to be transmitted between the inner race and the outer race; and a spring urging the pawl member to the inner race.

When the ratchet type one-way clutch thus configured rotates in one direction, the pawl member slides freely from the outer circumference of the inner race, which results in that the outer race and the inner race run idle relatively to each other. Then, in an attempt of the one-way clutch to rotate in the other direction, the pawl member engages with the notch to lock the one-way clutch. This enables the torque to be transmitted between the inner race and the outer race.

SUMMARY OF THE INVENTION

It is desired in a ratchet type one-way clutch that the behavior of a pawl member transmitting the torque is stabilized. The pawl member can sometimes slip out from the depth of the pocket at the time of idling, for example. There have been demands to take a prevention measure thereof.

Therefore, it is an object of the present invention to stabilize the behavior of the pawl member and improve the engagement performance of the ratchet type one-way clutch, thereby increasing the durability of the ratchet type one-way clutch.

In order to achieve the object described above, in an arrangement of a pawl member in a ratchet type one-way clutch of the present invention, the ratchet type one-way clutch includes: an outer race having a pocket on an inner circumference thereof; an inner race arranged on an inner diameter side of the outer race so as to be coaxial therewith, the inner race having a notch on an outer circumference thereof; a pawl member housed in the pocket and engaged with the notch of the inner race to transmit torque between the inner race and the outer race, the pawl member having a tip portion engaging with the notch and a circular portion; and a spring urging the pawl member to the inner race, wherein the pocket includes an circular arc portion with which the circular portion of the pawl member engages and a central angle of which is 180 degrees or greater, and the pawl member is arranged in such a manner that an angle between a segment between both ends of an opening of the circular arc portion and a segment between a center of the circular portion of the pawl member and a contact point at which the tip portion engages with the notch is greater than 90 degrees, and an angle between a central axis of the spring and a segment between the center of the circular portion and a center of the ratchet type one-way clutch is greater than 45.

The present invention provides following advantageous effects:

It is possible to stabilize the behavior of the pawl member and prevent the pawl member from slipping out from the pocket. This allows the engagement performance of the ratchet type one-way clutch to be improved, thereby increasing the durability of the ratchet type one-way clutch.

Further features of the present invention will become apparent from the following description of an exemplary embodiment with reference to the attached drawings.

DESCRIPTION OF THE EMBODIMENTS

Figure 1:
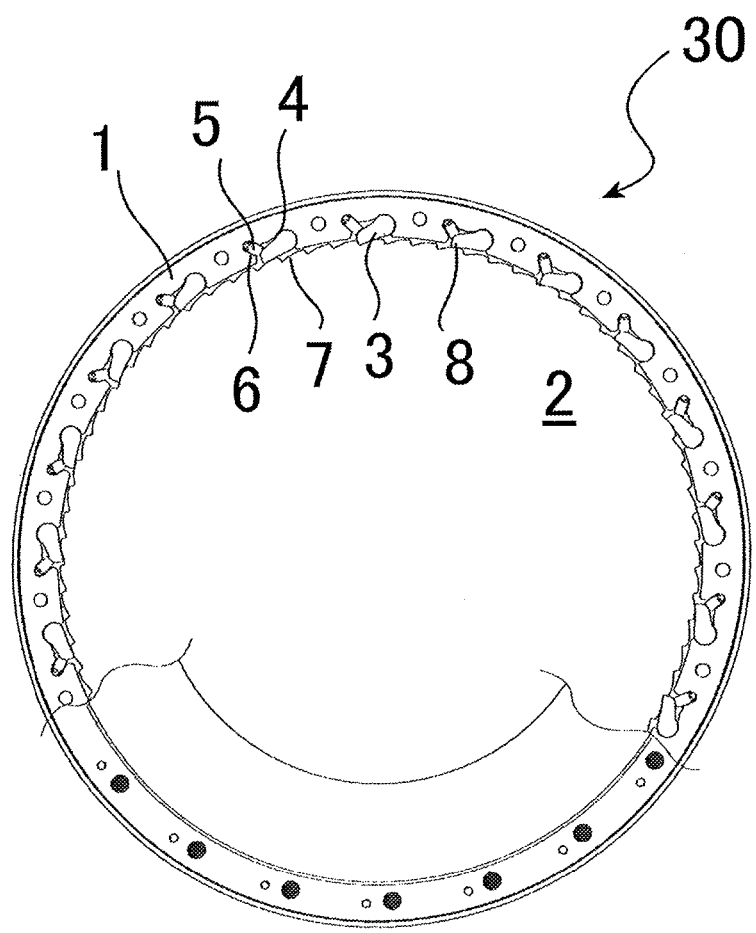
FIG. 1 is a front view of a ratchet type one-way clutch to which an embodiment of the present invention is applied.

A preferred embodiment of the present invention will now be described in detail in accordance with the accompanying drawings. Note that like reference characters denote corresponding parts throughout the drawings.

FIG. 1 is a front view of a ratchet type one-way clutch to which an embodiment of the present invention is applied.

The ratchet type one-way clutch 30 includes an outer race 1 having pockets 4 on an inner circumference thereof and an inner race 2 arranged on an inner diameter side of the outer race 1 so as to be coaxial with the outer race 1. The inner race 2 has notches 7 on an outer circumference thereof. In each of the pockets 4 opening toward the inner race 2, a pawl member 3, which engages with each of the notches 7 and transmits torque between the outer race 1 and the inner race 2, is rockably housed.

In a spring pocket 6 that opens toward each of the pockets 4 in a vicinity of a tip portion 8 of the pawl member 3 and extends radially outward, a spring 5 that urges the pawl member 3 to the inner race 2 is housed. The spring 5, which is a coil spring, abuts the tip portion 8 of the pawl member 3 with an axial end thereof and urges the pawl member 3 toward the inner diameter side.

A plurality of pawl members 3, pockets 4 and spring pockets 6 are provided circumferentially equally divided. The numbers thereof are optional and may be increased or decreased as appropriate in consideration of torque and so on. Note, however, that it is preferable to arrange them circumferentially at equal intervals.

Meanwhile, the inner race 2 engages with a shaft (not shown) that is fixed by splines (not shown) provided on an inner circumferential side. Each of the notches 7 extends axially, and an axial length thereof corresponds to an axial width of the pawl member 3. It is needless to say that the number of the notches 7 can optionally be set depending on, e.g., the number of the pawl members 3.

In the ratchet type one-way clutch 30 configured as above, the outer race 1 performs a function of being able to rotate to the right in FIG. 1 relatively to the inner race 2 but not being able to rotate to the left due to the engagement between the pawl member 3 and the notch 7. That is, while the ratchet type one-way clutch 30 can run idle to the right, it is locked against rotation to the left, thereby allowing torque to be transmitted between the inner race and the outer race. In the locked state, an engaging tip $8a$ of the tip portion 8 of the pawl member 3 (see FIG. 2) engages with an engaging recess 9 of the notch (see FIG. 2).

In accordance with the ratchet type one-way clutch 30 as described above, an embodiment of the present invention is now described.

Figure 2:
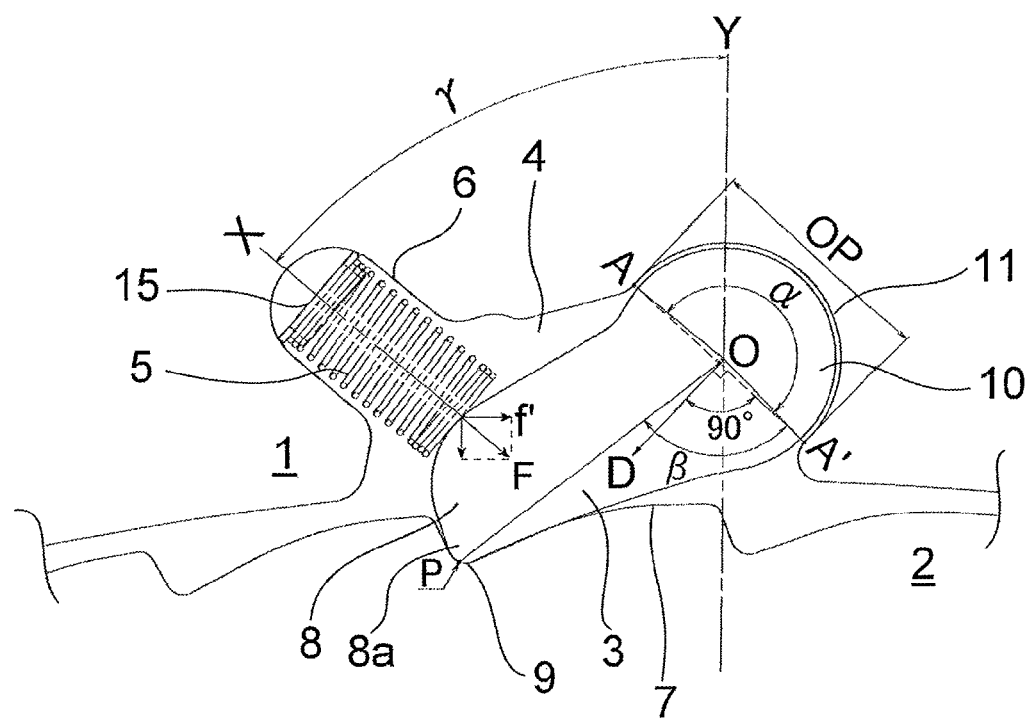
FIG. 2 is a schematic diagram of the embodiment of the present invention showing a relationship among a spring, a pawl member, an inner race and an outer race as enlargement.

FIG. 2 is a schematic diagram of the embodiment of the present invention showing a relationship among the spring, pawl member, inner race and outer race as enlargement.

As shown in FIG. 2, the pawl member 3 has the tip portion 8 engaging with the notch 7 and a circular portion 10, and the pocket 4 has a circular arc portion 11 with which the circular portion 10 of the pawl member 3 engages. An opening OP of the circular arc portion 11 defines a segment A-A' between both ends thereof. A guide member 15 is provided at an axial end of the spring 5 and guides the same so that the spring 5 can stably apply an urging force to the pawl member 3.

A slip-out direction D, to which the pawl member 3, in particular the circular portion 10 thereof, tends to slip out from the circular arc portion 11, is substantially perpendicular to the segment A-A'. The tip portion 8 of the pawl member 3 contacts the engaging recess 9 of the notch 7 at a contact point P.

Here, an angle of the opening OP, i.e., central angle of the circular arc portion 11 of the pocket 4 is $\alpha$, an angle defined between a line A-A' and a line O-P, i.e., a segment between a center of the circular portion 10 of the pawl member 3 and a contact point at which the tip portion 8 engages with the notch 7 is $\beta$, and the angle between an central axis X of the spring 5 and a center line Y of the inner race 2 (i.e., the arrangement angle of the spring 5) is $\gamma$.

In order to prevent the pawl member 3 from slipping out and stabilize the behavior of the same, these angles pertinent to the pawl member 3 are set as follows:

$$\alpha \geq 180° \quad (1)$$

$$\beta > 90° \quad (2)$$

$$\gamma > 45° \quad (3)$$

The angles thus set allow a force component f' of the force F of the spring 5 urging the pawl member 3 to be set large. This makes it possible that the force component f' presses the pawl member 3 to the direction opposite to the slip-out direction. Arranging the pawl member 3 in this manner causes a force to be applied to the pawl member 3 so that it is pressed toward the direction of the circular arc portion 11 of the pocket 4. Therefore, the pawl member 3 can be prevented from slipping out from the pocket 4.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2014-110910, filed May 29, 2014, which is hereby incorporated by reference herein in its entirety.

What is claimed is:

1. A ratchet type one-way clutch comprising:
    an outer race having a pocket on an inner circumference thereof;
    an inner race arranged on an inner diameter side of the outer race so as to be coaxial therewith, the inner race having a notch on an outer circumference thereof;
    a pawl member housed in the pocket to transmit torque between the inner race and the outer race, the pawl member having a tip portion engaging with the notch and a circular portion engaging with the pocket; and
    a spring urging the pawl member to the inner race, wherein
    the pocket includes a circular arc portion with which the circular portion of the pawl member engages, and a central angle of the circular arc portion engaging with the circular portion is 180 degrees or greater,
    the pawl member is arranged such that:
        a first angle facing radially inward and between a first segment between both ends of an opening of the circular arc portion and a second segment between a center of the circular portion of the pawl member and a contact point at which the tip portion engages with the notch is greater than 90 degrees, and
        a second angle facing the pawl member and between a central axis of the spring and a third segment between the center of the circular portion and a center of the ratchet type one-way clutch is greater than 45 degrees, and
    a force component of a force of the spring presses the pawl member in a direction opposite to a slip-out direction.

2. The ratchet type one-way clutch according to claim 1, wherein, in a cross-sectional view, a surface of the circular arc portion follows a circular arc extending from one end of the opening to the other end of the opening, and the central angle faces and is subtended by said arc.

3. The ratchet type one-way clutch according to claim 1, wherein the second angle is smaller than a corresponding supplementary angle formed by the central axis of the spring and the third segment.

4. The ratchet type one-way clutch according to claim 1, wherein an interior of the first angle overlaps with the slip-out direction, and
the slip-out direction is a direction in which the circular portion of the pawl member tends to slip from the circular arc portion.

5. The ratchet type one-way clutch according to claim 4, wherein the slip-out direction is perpendicular to the first segment.

6. The ratchet type one-way clutch according to claim 1, wherein the contact point engages with the notch at a radially inward most portion of the notch.

7. The ratchet type one-way clutch according to claim 1, wherein, in cross-sectional view, a surface of the pocket in contact with the circular portion of the pawl member is a continuous circular arc along its entire length and subtends an angle of at least 180 degrees.

* * * * *